United States Patent
Tanaka et al.

(10) Patent No.: US 8,200,882 B2
(45) Date of Patent: Jun. 12, 2012

(54) MEMORY SYSTEM, ACCESS CONTROL METHOD THEREFOR, AND COMPUTER PROGRAM

(75) Inventors: Hideo Tanaka, Kanagawa (JP); Yoshito Katano, Kanagawa (JP)

(73) Assignee: Sony Corporation, Tokyo (JP)

( * ) Notice: Subject to any disclaimer, the term of this patent is extended or adjusted under 35 U.S.C. 154(b) by 367 days.

(21) Appl. No.: 12/485,214

(22) Filed: Jun. 16, 2009

(65) Prior Publication Data

US 2009/0319730 A1    Dec. 24, 2009

(30) Foreign Application Priority Data

Jun. 19, 2008 (JP) ................................. 2008-160652

(51) Int. Cl.
*G06F 12/00* (2006.01)
(52) U.S. Cl. .......................................................... 711/5
(58) Field of Classification Search ........................ None
See application file for complete search history.

(56) References Cited

U.S. PATENT DOCUMENTS

| | | | |
|---|---|---|---|
| 6,182,192 B1 * | 1/2001 | Rovati | 711/111 |
| 6,622,225 B1 * | 9/2003 | Kessler et al. | 711/158 |
| 2009/0319730 A1 * | 12/2009 | Tanaka et al. | 711/154 |

FOREIGN PATENT DOCUMENTS

| | | |
|---|---|---|
| JP | 03-058150 | 3/1991 |
| JP | 07-225745 | 8/1995 |
| JP | 11-167546 | 6/1999 |
| JP | 3092566 | 7/2000 |
| JP | 3702630 | 7/2005 |

* cited by examiner

*Primary Examiner* — Brian Peugh
(74) *Attorney, Agent, or Firm* — Wolf, Greenfield & Sacks, P.C.

(57) ABSTRACT

A memory system includes: a memory that has plural banks; a memory controller that includes a request queue and a bank monitor and controls access to the memory; a master group including plural masters that can request access to the memory; and a system bus which is connected between the memory controller and the master group and in which an arbiter is arranged, wherein the request queue has a scheduling function for receiving access requests issued from the master group through the system bus and appropriately rearranging the received access requests and provides the arbiter with queue information, the bank monitor monitors information concerning respective banks of the memory and provides the arbiter with the bank information, and the arbiter arbitrates requests issued in parallel from the masters of the master group on the basis of the queue information and the bank information provided thereto and transmits the information to the memory controller as access control information.

8 Claims, 9 Drawing Sheets

READ ACCESS TO DDR2-SDRAM (BURST LENGTH 4)

READ ACCESS TO DDR2-SDRAM (BURST LENGTH 4)
ACCESS TO SAME BANKS AND DIFFERENT ROWS

READ ACCESS TO DDR2-SDRAM (BURST LENGTH 4) ACCESS TO DIFFERENT BANKS

READ ACCESS TO DDR2-SDRAM (BURST LENGTH 4)
ACCESS TO SAME BANKS AND SAME ROWS

WRITE ACCESS TO DDR2-SDRAM (BURST LENGTH 4)

WRITE ACCESS TO DDR2-SDRAM (BURST LENGTH 4)
ACCESS TO SAME BANKS AND DIFFERENT ROWS

MEMORY SYSTEM, ACCESS CONTROL METHOD THEREFOR, AND COMPUTER PROGRAM

BACKGROUND OF THE INVENTION

1. Field of the Invention

The present invention relates to a memory system in which a memory controller or the like manages access to a memory, an access control method for the memory system, and a computer program.

2. Description of the Related Art

In general, efficiency of memory access is realized by performing so-called scheduling for rearranging access requests from a master group received by a single memory controller to optimize the memory access.

For example, JP-A-11-167546 discloses an arbitration technique for a bus arbiter connected to a memory controller.

In this technique, efficiency of memory access is realized by managing bank information of an access request from a specific master and masking, for a fixed period, access requests from other masters to a memory bank being accessed and in a busy state.

For example, Japanese Patent No. 3092566 discloses a technique for transmitting, for an increase in speed of memory access, a bank state of a memory, to which a memory controller is connected, to the outside of the memory controller.

In this technique, the bank state is notified to a master and issuance of an access request to a bank being accessed and in a busy state is controlled.

SUMMARY OF THE INVENTION

However, in the technique for realizing efficiency of memory access by performing scheduling, a range of the optimization by the rearrangement of access requests is limited to requests received in a request queue.

Therefore, the memory access is locally optimized and is not optimized in the entire system.

In the technique disclosed in JP-A-11-167546, in order to mask access request from the other masters for the fixed period, a cycle from reception of an access request by the memory controller until actual access has to be clarified.

When the memory controller performs scheduling again, the cycle until the memory is actually accessed is found only when a scheduling result is obtained.

Therefore, it is difficult to appropriately set a period for masking the access requests from the other masters.

When the mask period is too long, access from the other masters is kept waiting.

It is difficult to continuously perform access from the other masters to the same bank and the same page. Therefore, efficiency of the access falls.

In the technique disclosed in Japanese Patent No. 3092566, it is necessary to allow respective masters to issue access requests taking into account the bank state of the memory. Therefore, correction may be essential in a master IP or the like based on a premise that the masters are connected to an open protocol bus.

Thus, it is desirable to provide a memory system, an access control method therefore, and a computer program that can realize optimization of the entire system, appropriately set a period for masking access requests from other masters, and realize efficiency of continuous access to the same bank and the same page and do not always need correction during connection to a specific bus.

According to a first embodiment of the present invention, there is provided a memory system including: a memory that has plural banks; a memory controller that includes a request queue and a bank monitor and controls access to the memory; a master group including plural masters that can request access to the memory; and a system bus which is connected between the memory controller and the master group and in which an arbiter is arranged. The request queue has a scheduling function for receiving access requests issued from the master group through the system bus and appropriately rearranging the received access requests and provides the arbiter with queue information. The bank monitor monitors information concerning respective banks of the memory and provides the arbiter with the bank information. The arbiter arbitrates requests issued in parallel from the masters of the master group on the basis of the queue information and the bank information provided thereto and transmits the information to the memory controller as access control information.

Preferably, the arbiter transmits a request to the memory controller to reduce a penalty cycle.

Preferably, the request is formed with a bank address, a row address, and a column address and/or a request issuance master ID and priority information in addition to data of the request.

Preferably, the bank information includes information concerning a page currently opened in the banks.

Preferably, the queue information includes information concerning a bank and a page accessed by a request put on standby in the request queue, information concerning whether the request is a read request or a write request, and a request issuance master ID, and priority information.

According a second embodiment of the present invention, there is provided an access control method for a memory system including the steps of: performing scheduling for receiving access requests to a memory including plural banks issued from a master group through a system bus and appropriately rearranging the received access requests; providing an arbiter of the system with queue information put on standby in a request queue by the scheduling; monitoring information concerning the banks of the memory; providing the arbiter with the bank information obtained by the monitoring; arbitrating, in the arbiter, requests issued in parallel from masters of the master group on the basis of the queue information and the bank information provided to the arbiter; and managing an access to the memory according to the information obtained by the arbitration.

According to a third embodiment of the present invention, there is provided a computer program for causing a computer to execute access control for a memory system including: processing for performing scheduling for receiving access requests to a memory including plural banks issued from a master group through a system bus and appropriately rearranging the received access requests; processing for providing an arbiter of the system with queue information put on standby in a request queue by the scheduling; processing for monitoring information concerning the banks of the memory; processing for providing the arbiter with the bank information obtained by the monitoring; processing for arbitrating, in the arbiter, requests issued in parallel from masters of the master group on the basis of the queue information and the bank information provided to the arbiter; and processing for managing an access to the memory according to the information obtained by the arbitration.

According to the embodiments of the present invention, the request queue of the memory controller receives access requests to the memory including the plural banks issued from the master group through the system bus.

The request queue performs the scheduling for appropriately rearranging the received access requests and provides the arbiter on the system bus with queue information of the scheduling.

The bank monitor monitors information concerning the banks of the memory and provides the arbiter with the bank information.

The arbiter arbitrates requests issued in parallel from the masters of the master group on the basis of the queue information and the bank information provided to the arbiter and transmits the information to the memory controller as access control information.

According to the embodiments of the present invention, there is an effect that it is possible to optimize the entire system and appropriately set a period for masking access requests from other masters. There is also an effect that it is possible to realize efficiency of continuous access to the same bank and the same page and correction during connection to a specific bus is not always necessary.

DESCRIPTION OF THE PREFERRED EMBODIMENTS

An embodiment of the present invention is explained below with reference to the accompanying drawings.

Figure 1:
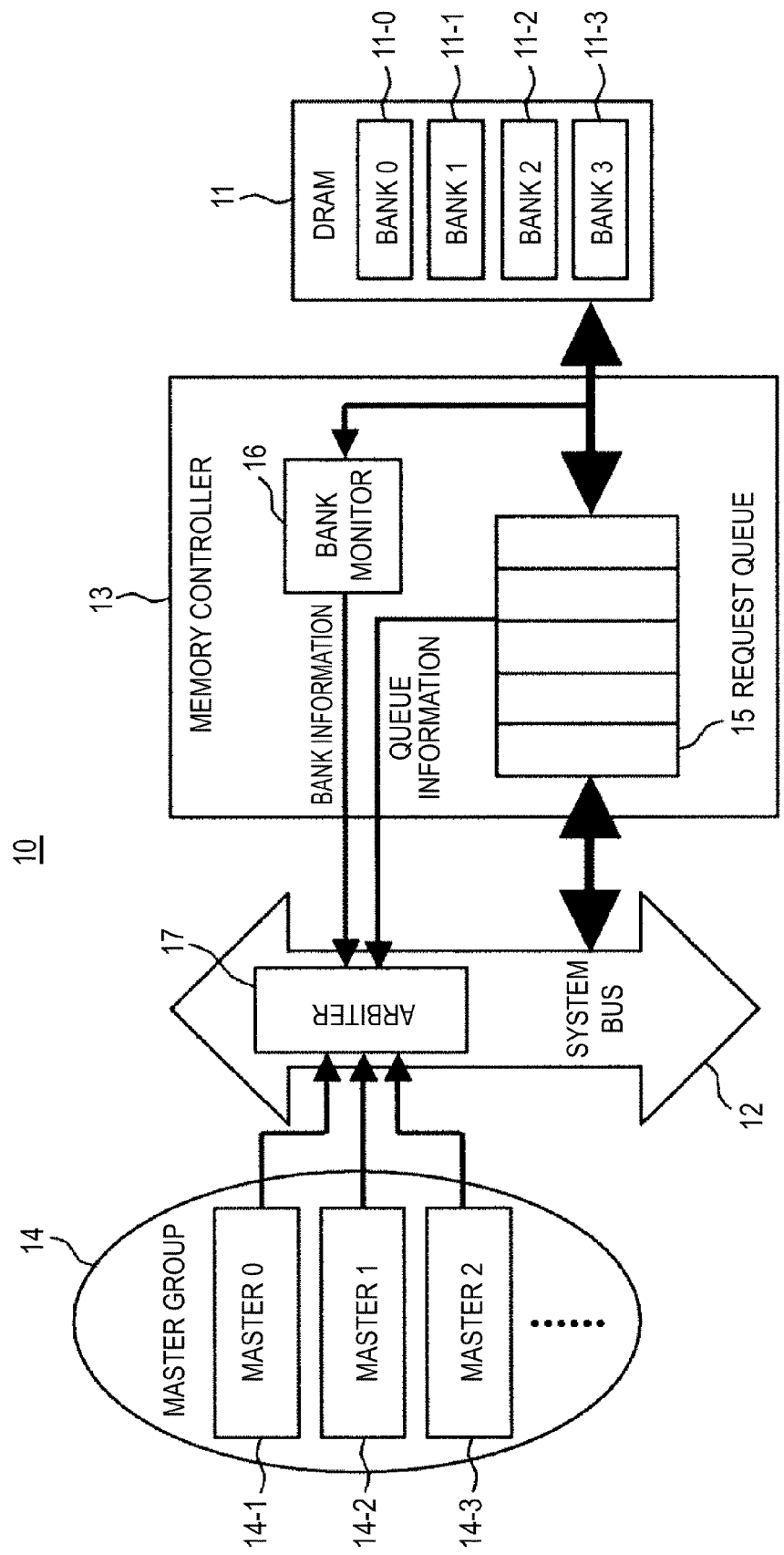
FIG. 1 is a diagram of a configuration example of a memory system according to an embodiment of the present invention.

FIG. 1 is a diagram of a configuration example of a memory system according to the embodiment.

The memory system 10 includes, as shown in FIG. 1, a memory 11, a system bus 12, a memory controller 13, a master group 14, a request queue 15, a bank monitor 16, and an arbiter 17.

The memory 11 is, for example, a dynamic memory (SDR/DDR-SDRAM) present on the outside of an SoC.

The memory 11 has plural (in the example shown in FIG. 1, four) banks 11-0 to 11-3. When memory access is performed, one page in the banks is opened and accessed.

The system bus 12 performs exchange of data between the memory controller 13 and the master group 14.

The arbiter 17 is arranged in the system bus 12.

The memory controller 13 is present in the SoC and controls access to the memory 11.

The master group 14 is present in the SoC and includes plural masters 14-0, 14-1, 14-2, and the like. The master group 14 can request access to the memory 11 through the system bus 12 and the memory controller 13.

The masters 14-0, 14-1, and the like as elements of the master group 14 issue a write request and a read request to the memory 11.

One request is formed with a bank address, a row address, a column address, and other information such as a request issuance master ID and priority information in addition to data of the request.

The request queue 15 is arranged in the memory controller 13 and receives access requests issued from the master group 14 through the system bus 12.

The request queue 15 has a scheduling function for appropriately rearranging the received access requests.

The request queue 15 provides the arbiter 17 on the system bus 12 with queue information.

The bank monitor 16 is arranged in the memory controller 13 and monitors information concerning respective banks of the memory 11.

The bank monitor 16 provides the arbiter 17 on the system bus 12 with the bank information.

The arbiter 17 accompanies the system bus 12 and has a function of arbitrating requests issued in parallel from the masters of the master group 14 and transmitting the requests to the memory controller 13.

The memory system 10 optimizes throughput of memory access explained later on the basis of the queue information and the bank information output by the request queue 15 and the bank monitor 16.

The bank information includes information concerning a page currently opened in the banks 11-0 to 11-3.

The queue information includes information concerning a bank and a page accessed by a request put on standby in a request queue, information concerning whether the request is a read request or a write request, and a request issuance master ID, and priority information.

The memory system 10 is configured as a dynamic memory system that determines and changes priority order of access from a memory state and a scheduler state in the memory controller 13.

The memory system 10 notifies the arbiter 17 on the system bus 12 of a bank state of the memory managed by the memory controller 13 and access request information stored in the request queue 15.

The memory system 10 has a function of performing arbitration of requests to improve throughput of memory access.

More specifically, in the memory system 10, the memory controller 13 notifies the arbiter 17 on the bus of bank information including page open information of the banks of the memory 11 and information concerning banks, rows, read and write, and the like as request information in the request queue 15.

Consequently, the memory system 10 can optimize, for the entire system, scheduling in the request queue 15.

The memory system 10 notifies the arbiter 17 of a request issuance master ID and priority information of a request in addition to the information concerning banks, rows, and read and write as the request information in the request queue 15.

Consequently, the memory system 10 can optimize, for the entire system, scheduling in the request queue 15.

A timing cycle at read time and write time when bank information and the like are not notified to the arbiter 17 unlike the memory system 10 according to this embodiment is explained with reference to FIGS. 2 to 9.

After the explanation, superiority and the like of the memory system 10 according to this embodiment are explained.

Figure 2:
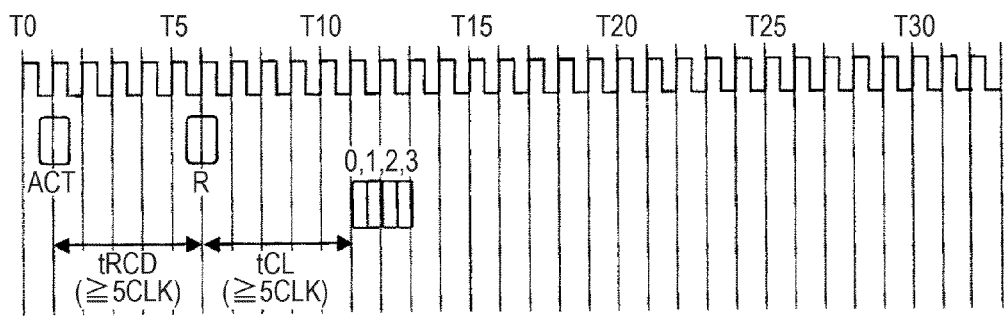
FIG. 2 is a diagram for explaining a read time timing cycle at the time when a DDR2-SDRAM (DDR667 5-5-5) is connected.

A read time timing cycle at the time when a DDR2-SDRAM (DDR667 5-5-5) is connected is shown in FIG. 2.

As an example, the following explanation refers to a read time timing cycle at the time when burst length is 4.

Addresses of the SDRAM are divided into three kinds of addresses, i.e., a bank address, a row address, and a column address.

When data is read from the SDRAM, a control line and an address line are driven to transmit an active command ACT.

The active command ACT includes the bank address and the row address. The SDRAM sets a page of a designated bank in an active state.

A read command R is transmitted five cycles after the active command ACT (at T6). The read command R includes the bank address and the column address. When the read command and the active command ACT are combined, all the addresses of the SDRAM are designated.

Read data are returned (0, 1, 2, and 3 are returned because the burst length is 4) five cycles after the read command R (at T11).

A read time timing cycle at the time when read access continues is explained.

Figure 3:
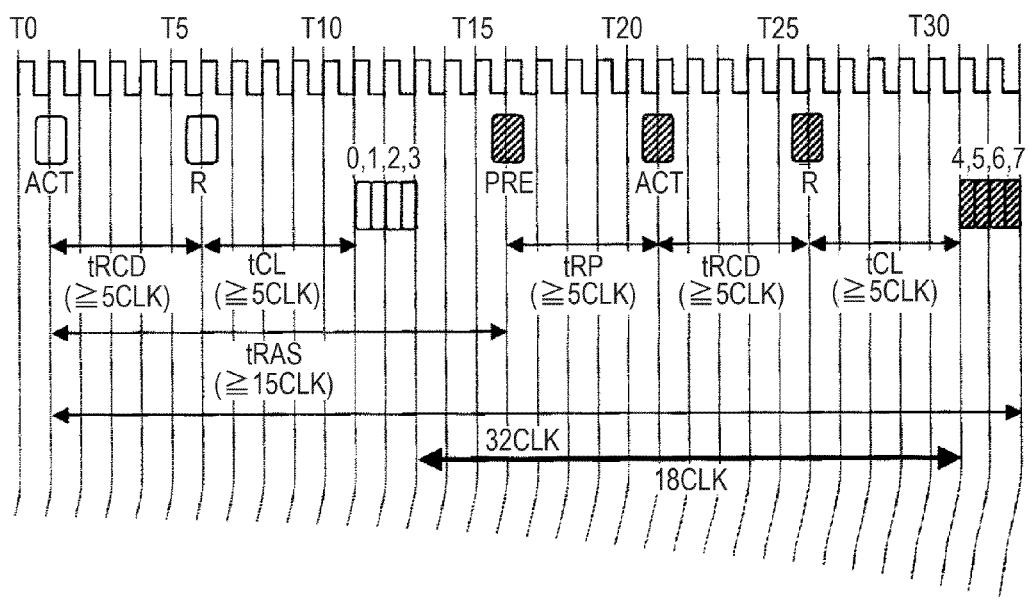
FIG. 3 is a diagram for explaining a read time timing cycle at the time when read access continues, bank addresses are the same, and row addresses are different.
Figure 4:
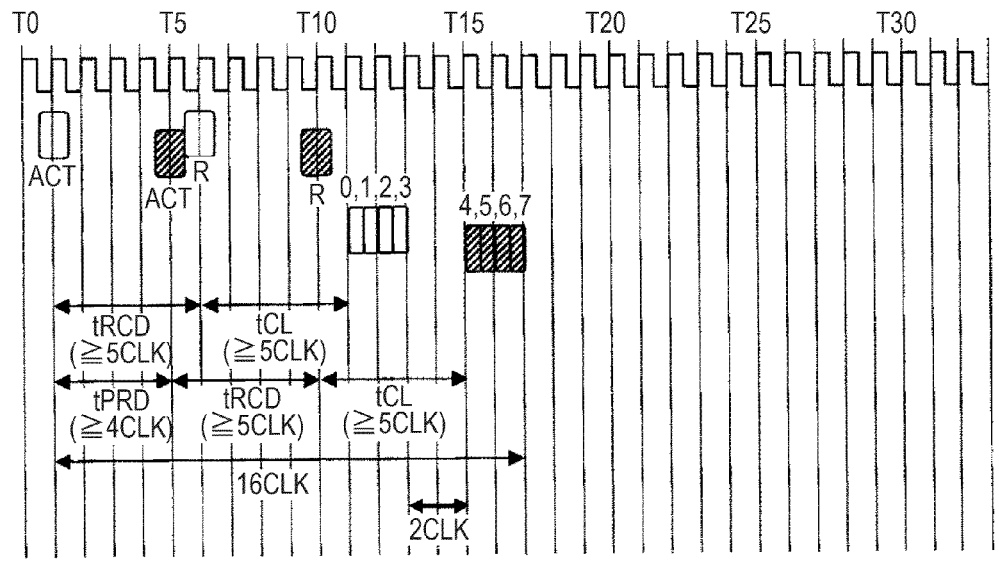
FIG. 4 is a diagram for explaining a read time timing cycle at the time when read access continues and bank addresses are different.
Figure 5:
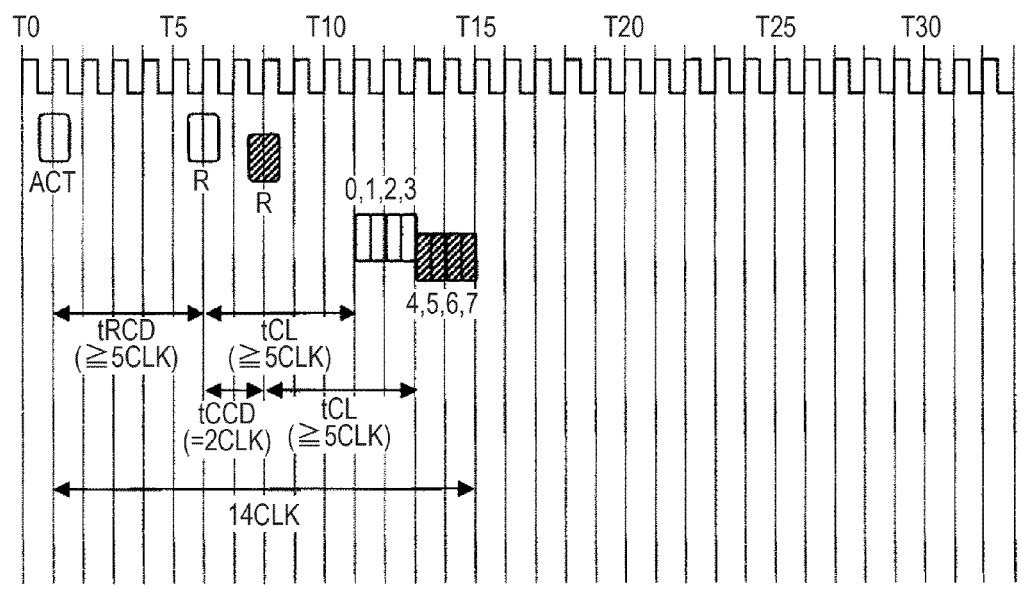
FIG. 5 is a diagram for explaining a read time timing cycle at the time when read access continues, bank addresses are the same, and row addresses are the same.

A read time timing cycle at the time when bank addresses are the same and row addresses are different is shown in FIG. 3. A read time timing cycle at the time when bank addresses are different is shown in FIG. 4. A read time timing cycle at the time when bank addresses are the same and row addresses are the same is shown in FIG. 5.

When bank addresses are the same and row addresses are different, i.e., when a page mishit occurs, it is necessary to close a presently active page and activate a different page.

Therefore, as shown in FIG. 3, a page accessed first according to a pre-charge command PRE is inactivated. This command is issued fifteen cycles after a preceding active command ACT (at T16).

The active command is issued again five cycles after the pre-charge command PRE (at T21). Access is completed in thirty-two cycles (at T33) according to a procedure same as that explained above.

When bank addresses are different, since one page can be activated for each of the banks because of a characteristic of the SDRAM, it is unnecessary to inactivate pages unlike the case of the page mishit.

However, because of access parameters specified in DDR667, as shown in FIG. 4, vacancy of two cycles occurs between continuous read data.

Consequently, access is completed in sixteen cycles (at T17).

When bank addresses are the same and row addresses are the same, since a page to be accessed is already activated in first read access, it is unnecessary to issue an active command. Therefore, it is possible to access the page only with a read command R. As shown in FIG. 5, no cycle vacancy occurs between read data.

Consequently, access is completed in fourteen cycles (at T15).

In this way, in continuous read access, overhead (a penalty cycle) necessary among plural accesses increases in order of the same-bank and same-row address access, the different-bank address access, and the same-bank and different-row address access, A timing cycle at write time is explained.

Figure 6:
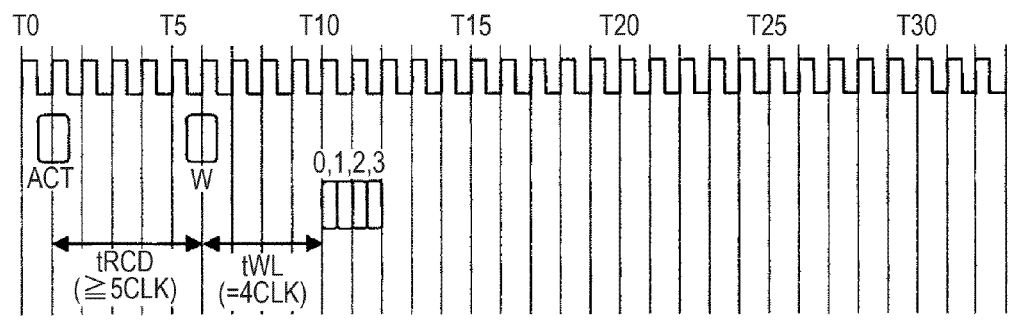
FIG. 6 is a diagram for explaining timing access of single write access at the time when a DDR2-SDRAM (DDR667 5-5-5) is connected.
Figure 7:
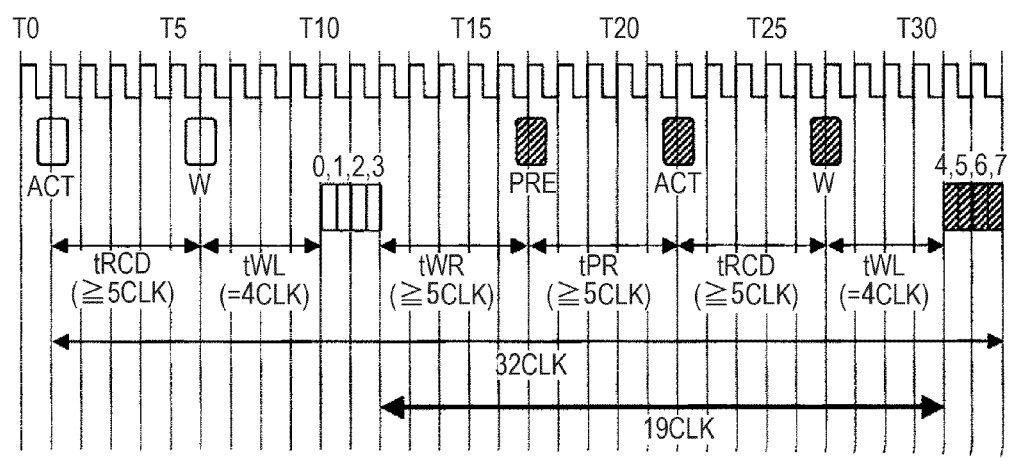
FIG. 7 is a diagram for explaining a write time timing cycle at the time when write access continues, bank addresses are the same, and row addresses are different.
Figure 8:
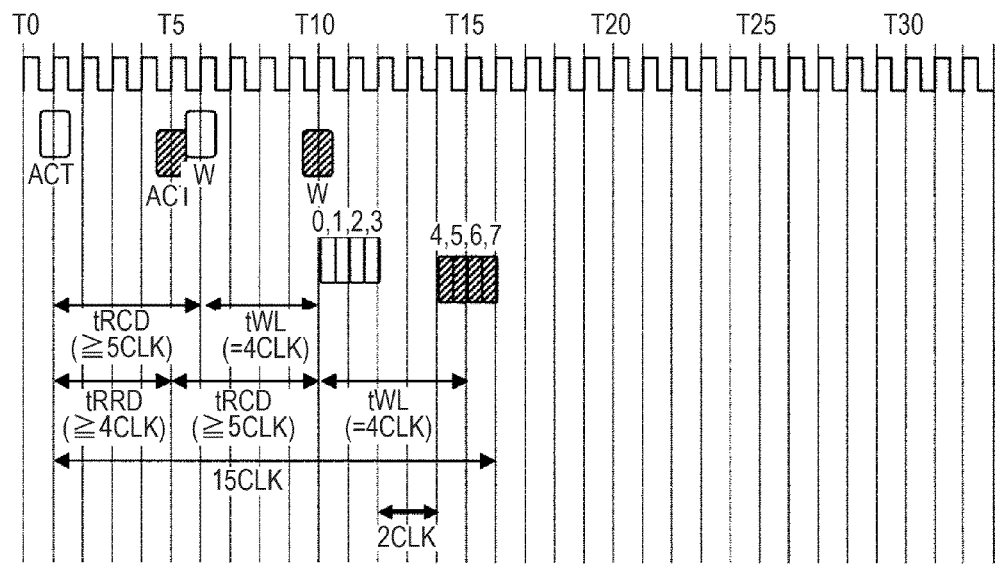
FIG. 8 is a diagram for explaining a write time timing cycle at the time when write access continues and bank addresses are different.

Timing of single write access is shown in FIG. 6. Timing of continuous write access to same-bank and different-row addresses is shown in FIG. 7. Timing of continuous write access to different-bank addresses is shown in FIG. 8. Timing of continuous write access to same-bank and same-row addresses is shown in FIG. 9.

Figure 9:
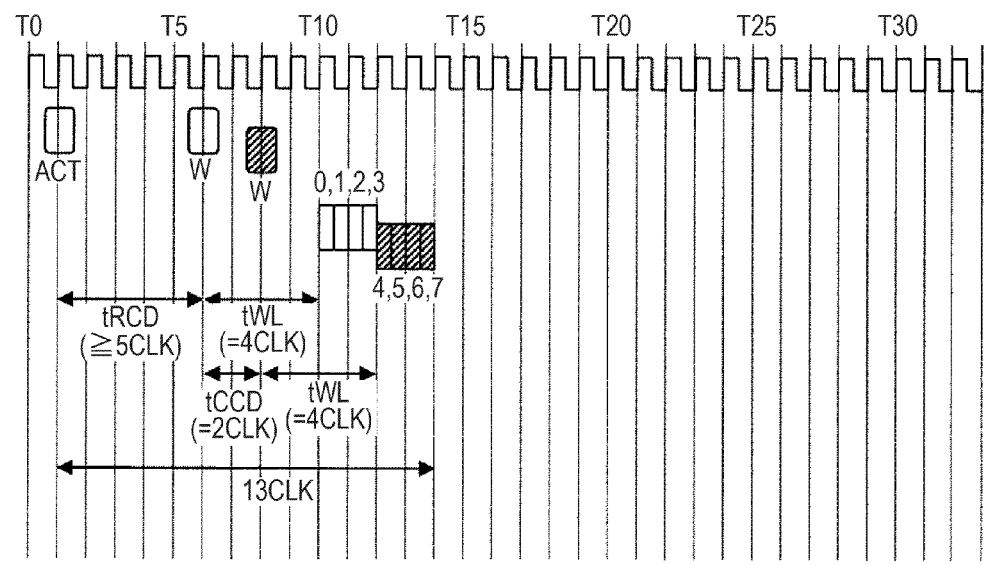
FIG. 9 is a diagram for explaining a write time timing cycle at the time when write access continues, bank addresses are the same, and row addresses are the same.

It is seen that the above explanation concerning the continuous read address referring to FIGS. 7 to 9 applies at the time of continuous write access.

As shown in FIGS. 2 to 9, in the continuous requests, a penalty cycle substantially changes depending on whether bank and row (page) addresses are the same or different.

Figure 10:
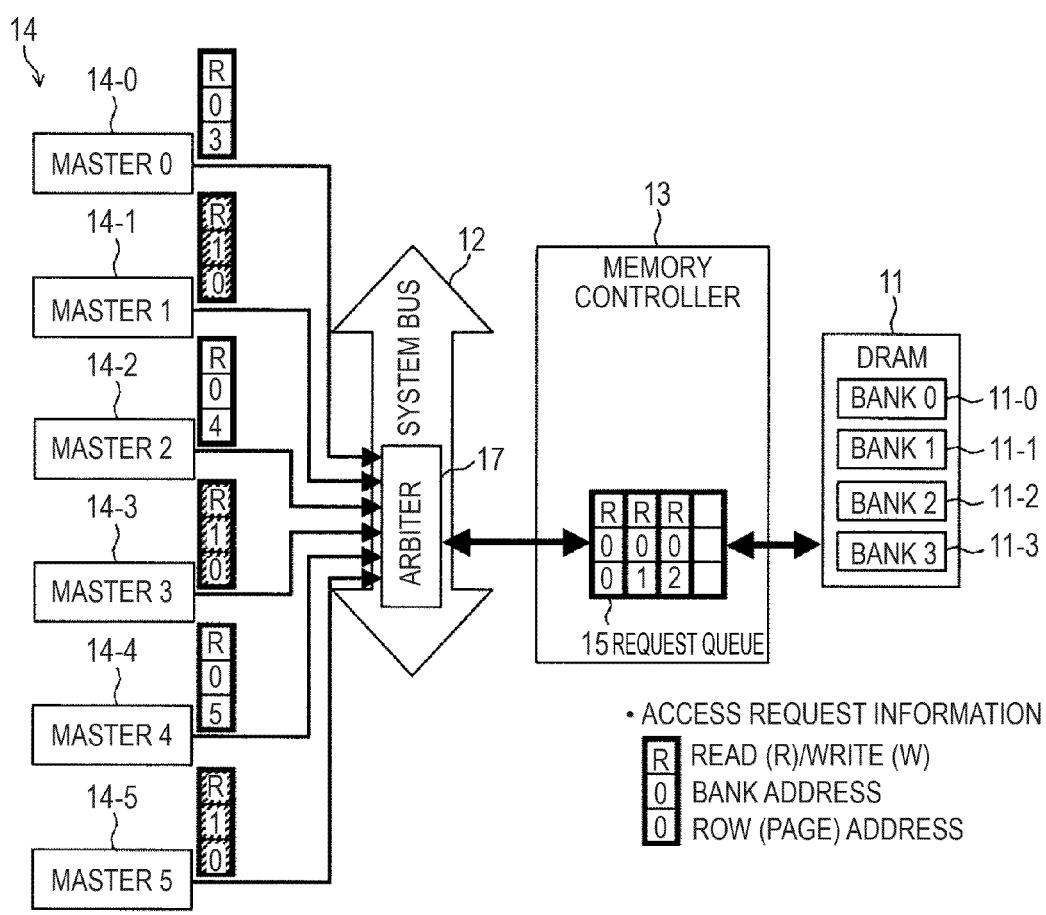
FIG. 10 is a conceptual diagram of arbitration of access requests in a general memory system.
Figure 11:
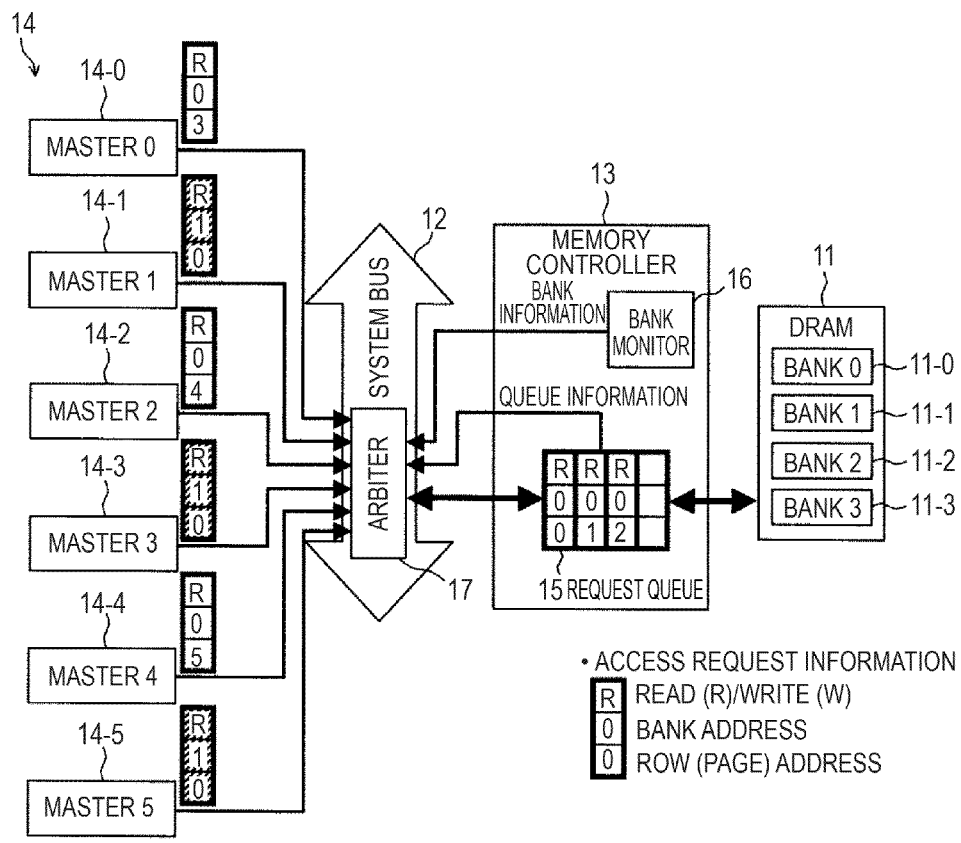
FIG. 11 is a conceptual diagram of arbitration of access requests in the memory system according to this embodiment.

To indicate superiority of the memory system 10 according to this embodiment, as an example, arbitration of access requests in a general memory system shown in FIG. 10 and arbitration of access requests in the memory system according to this embodiment shown in FIG. 11 are compared.

FIG. 10 is a conceptual diagram of the arbitration of access requests in the general memory system.

FIG. 11 is a conceptual diagram of the arbitration of access requests in the memory system according to this embodiment.

Figure 12:
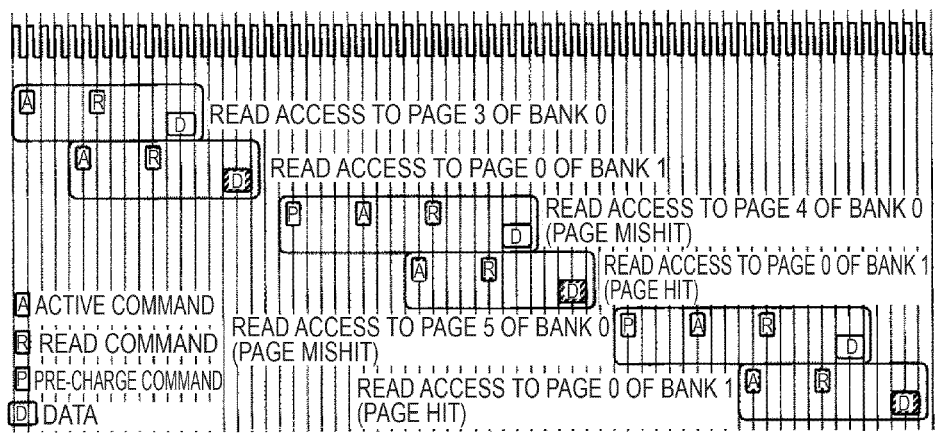
FIG. 12 is a diagram of an access example in the memory system shown in FIG. 10.

FIG. 12 is a diagram of an access example in the memory system shown in FIG. 10.

Figure 13:
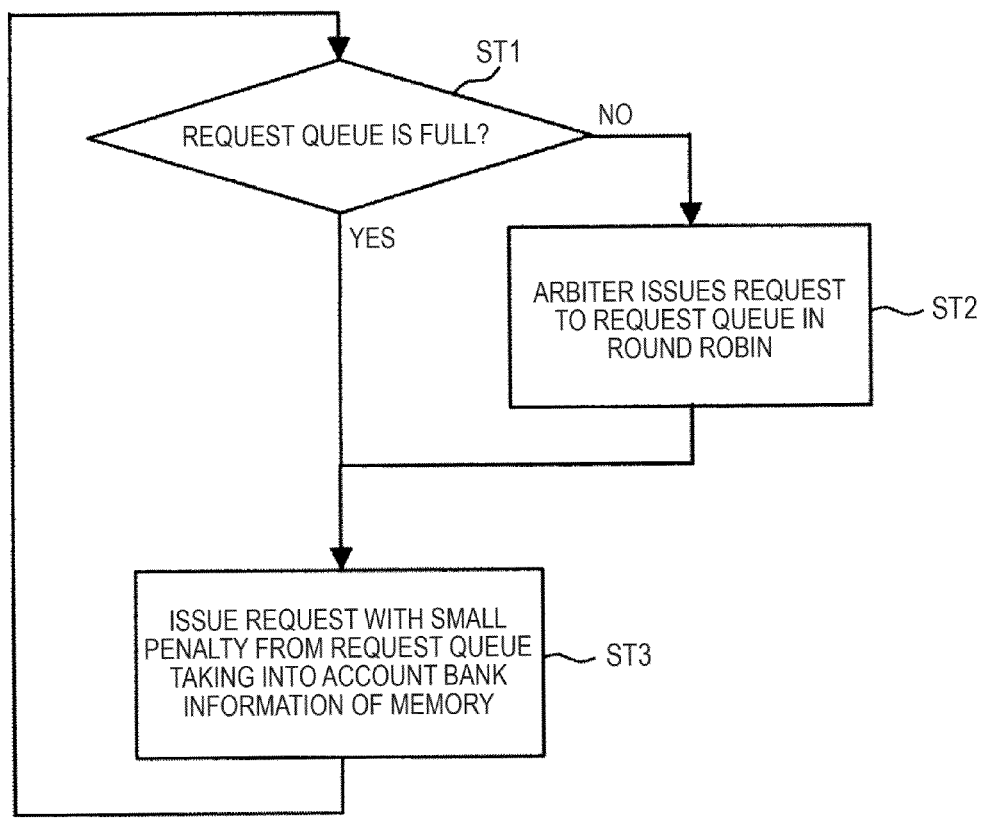
FIG. 13 is a flowchart of arbitration processing in the memory system shown in FIG. 10.

FIG. 13 is a flowchart of arbitration processing in the memory system shown in FIG. 10.

Figure 14:
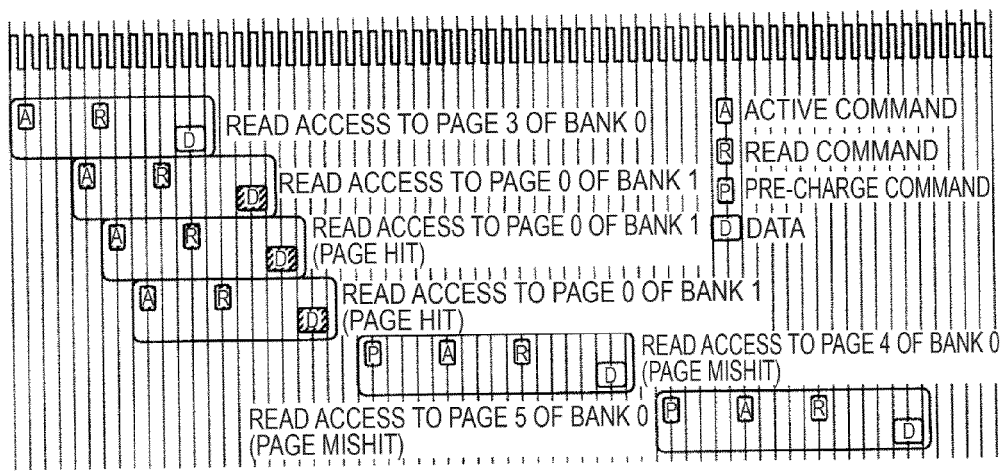
FIG. 14 is a diagram of an access example in the memory system shown in FIG. 11.

FIG. 14 is a diagram of an access example in the memory system shown in FIG. 11.

Figures 15, 16:
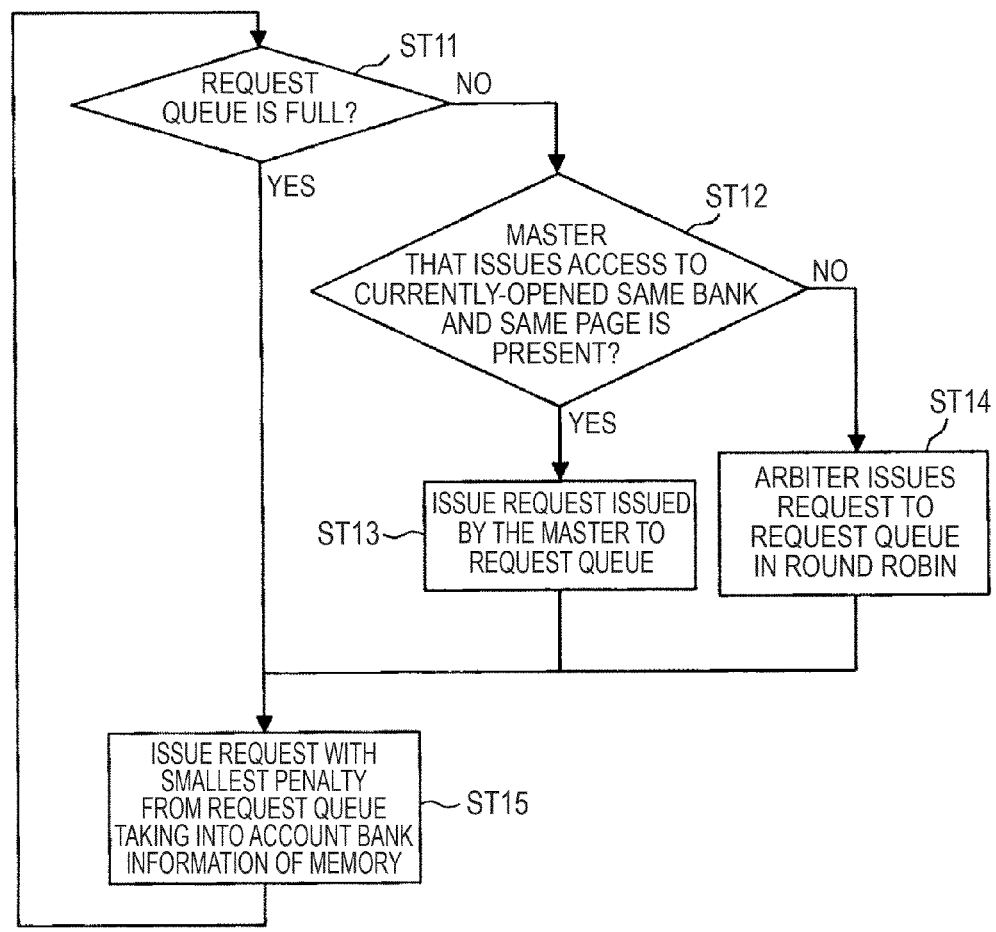
FIG. 15 is a flowchart of arbitration processing in the memory system shown in FIG. 11.
FIG. 16 is a table for clarifying a difference between FIGS. 12 and 14, wherein an example of order of access requests received by a memory and a penalty cycle that occurs when bank addresses of requests and pages coincide with each other (when a pre-charge command is unnecessary) is shown.

FIG. 15 is a flowchart of arbitration processing in the memory system shown in FIG. 11.

In FIG. 10, to facilitate understanding, functional units same as those shown in FIGS. 1 and 11 are denoted by the same reference numerals and signs.

It is assumed that the arbiter 17 adopts a simple round-robin system for counting up IDs in order from the master 14-0 of the master group 14.

It is assumed that the masters 14-0, 14-2, and 14-4 among the six request issuing masters issue read access requests to the bank 11-0 of the memory 11. It is assumed that the masters 14-1, 14-3, and 14-5 issue read access requests to the bank 11-1.

It is assumed that row addresses of access requests to the bank 11-0 do not overlap each other and all row addresses of access requests to the bank 11-1 are the same.

Further, it is assumed that the request queue 15 in the memory controller 13 except one queue is filled with the read access requests to the bank 11-0 (without overlap of row addresses). It is assumed that the banks 11-0 to 11-3 of the memory 11 start from a pre-charged state.

Since the arbiter 17 adopts the simple round-robin system, in a system configuration shown in FIG. 10, access requests are stored in the request queue 15 in the memory controller 13 in order from an access request of the master 14-0 (ST1 and ST2).

In this case, a read access request to the bank 11-0 is issued to the memory 11 (any one of queues in the request queue 15).

Subsequently, the arbiter 17 passes an access request of the master 14-1 to the memory controller 13.

Requests in the request queue 15 are read access to another page of the bank 11-0 and read access to the bank 11-1. Therefore, an access request to the bank 11-1 with less penalty cycle is issued to the memory 11 (ST3).

The arbiter 17 passes an access request of the master 14-2 to the memory controller 13.

In this case, a request in the request queue 15 is only read access to another page of the bank 11-0. Therefore, a read access request to the bank 11-0 is issued to the memory 11.

Thereafter, this processing is repeated.

In a system configuration shown in FIG. 11, access requests are stored in the request queue 15 in the memory controller 13 in order from an access request of the master 14-0 (ST11).

In this case, a read access request to the bank 11-0 is issued to the memory 11 (any one of queues in the request queue 15). The bank monitor 16 notifies the arbiter 17 that a page 3 of the bank 11-0 is in an open state (ST12 to ST14).

Subsequently, the arbiter 17 confirms that an access request to the same page of the bank 11-0 is not issued from the master group 14 and passes an access request from the master 14-1 to the memory controller 13.

Requests in the request queue 15 are read access to another page of the bank 11-0 and read access to the bank 11-1. Therefore, an access request to the bank 11-1 with less penalty cycle is issued to the memory 11 (ST15).

The bank monitor 16 in the memory controller 13 notifies the arbiter 17 that a page 0 of the bank 11-1 is in an open state.

In the simple round-robin system, the arbiter 17 passes an access request from the master 14-2 to the memory controller 17.

In this case, the bank monitor 16 has already notified that the page 0 of the bank 11-1 is in the open state. Therefore, an access request to the master 14-3 or the master 14-5 with a penalty cycle closer to 0 is passed to the memory controller 13 and is directly issued to the memory 11.

FIG. 16 is a table for clarifying a difference between FIGS. 12 and 14. In FIG. 16, an example of order of access requests received by a memory and a penalty cycle that occurs when bank addresses of requests and pages coincide with each other (when a pre-charge command is unnecessary) is shown.

As it is seen from FIG. 16, in the memory system according to this embodiment, a penalty cycle is reduced during the operation compared with the existing system.

According to this embodiment, in the memory system 10, the memory controller 13 notifies the arbiter 17 on the bus of bank information including page open information of the banks of the memory 11 and information concerning banks, rows, read and write, and the like as request information in the request queue 15. The arbiter 17 arbitrates requests issued in parallel from the masters of the master group 14 and transmits the requests to the memory controller 13.

In other words, the arbiter 17 unitarily performs not only local optimization by scheduling in the request queue 15 in the memory controller 13 but also arbitration taking into account the bank information provided by the bank monitor 16 and the queue information provided by the request queue 15.

Therefore, according to this embodiment, effects explained below can be obtained.

Since the arbiter 17 in the system bus 12 unitarily performs arbitration taking into account the bank information provided by the bank monitor 16 and the queue information provided by the request queue 15, it is possible to perform optimization of access requests in a wider range.

Since the arbiter 17 in the system bus 12 transmits a request to the memory controller 13 to reduce a penalty cycle, it is possible to improve throughput between a chip and a memory.

The method explained above in detail can also be formed as a computer program corresponding to the procedure and can be executed by a computer such as a CPU.

Such a computer program can be stored a recording medium such as a semiconductor memory, a magnetic disk, an optical disk, or a floppy (registered trademark) disk. The computer in which the recording medium is set can access the recording medium and execute the computer program.

The present application contains subject matter related to that disclosed in Japanese Priority Patent Application JP 2008-160652 filed in Japan Patent Office on Jun. 19, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A memory system comprising:
   a memory that has plurality of banks;
   a memory controller that includes a request queue and a bank monitor and controls access to the memory;
   a master group including plurality of masters that can request access to the memory; and
   a system bus which is connected between the memory controller and the master group and in which an arbiter is arranged, wherein
   the request queue has a scheduling function for receiving access requests issued from the master group through the system bus and appropriately rearranging the received access requests and provides the arbiter with queue information,
   the bank monitor monitors bank information concerning respective banks of the memory and provides the arbiter with the bank information, and
   the arbiter arbitrates requests issued in parallel from among the plurality of masters of the master group based on the queue information and the bank information provided thereto and transmits access control information to the memory controller.

2. The memory system according to claim 1, wherein the arbiter transmits a request to the memory controller to reduce a penalty cycle.

3. The memory system according to claim 2, wherein the request is formed with a bank address, a row address, and a column address and/or a request issuance master ID and priority information in addition to data of the request.

4. The memory system according to any one of claims 1 to 3, wherein the bank information includes information concerning a page currently opened in the plurality of banks.

5. The memory system according to any one of claims 1 to 3, wherein the queue information includes information concerning a bank and a page accessed by a first request put on standby in the request queue, information concerning whether the first request is a read request or a write request, and a request issuance master ID, and priority information.

6. The memory system according to any one of claims 1 to 3, wherein
the bank information includes information concerning a page currently opened in the banks, and
the queue information includes information concerning a bank and a page accessed by a first request put on standby in the request queue, information concerning whether the first request is a read request or a write request, and a request issuance master ID, and priority information.

7. An access control method for a memory system comprising steps of:
performing scheduling by receiving access requests to a memory including plurality of banks issued from a master group through a system bus and appropriately rearranging the received access requests;
providing an arbiter of the system with queue information put on standby in a request queue by the scheduling;
monitoring bank information concerning the plurality of banks of the memory;
providing the arbiter with the bank information obtained by the monitoring;
arbitrating, in the arbiter, requests issued in parallel from among a plurality of masters of the master group based on the basis of the queue information and the bank information provided to the arbiter; and
managing an access to the memory according to access control information obtained by the arbitration.

8. A recording medium comprising computer-executable instructions that, when executed, perform a method for controlling access control for a memory system, the method comprising:
performing scheduling by receiving access requests to a memory including plurality of banks issued from a master group through a system bus and appropriately rearranging the received access requests;
providing an arbiter of the system with queue information put on standby in a request queue by the scheduling;
monitoring information concerning the banks of the memory;
providing the arbiter with the bank information obtained by the monitoring;
arbitrating, in the arbiter, requests issued in parallel from among a plurality of masters of the master group based on the basis of the queue information and the bank information provided to the arbiter; and
managing an access to the memory according to access control information obtained by the arbitration.

* * * * *